(No Model.)
H. JENSEN.
STARCHING MACHINE.
No. 594,830. Patented Nov. 30, 1897.
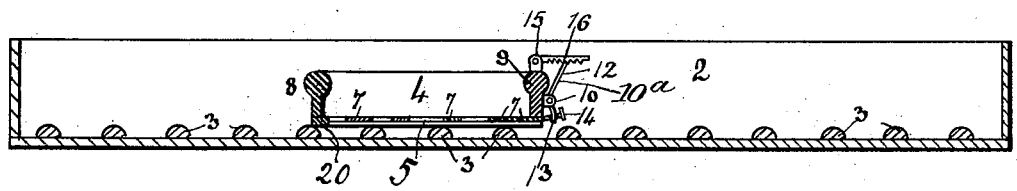
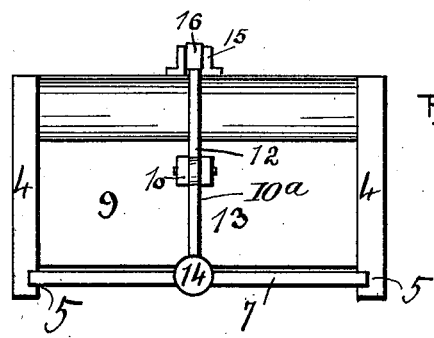
WITNESSES:
A. Ellejer
A. C. Hess
INVENTOR
Hans Jensen
BY
ATTORNEY.

UNITED STATES PATENT OFFICE.

HANS JENSEN, OF OMAHA, NEBRASKA.

STARCHING-MACHINE.

SPECIFICATION forming part of Letters Patent No. 594,830, dated November 30, 1897.

Application filed April 13, 1896. Serial No. 587,403. (No model.)

*To all whom it may concern:*

Be it known that I, HANS JENSEN, residing at Omaha, in the county of Douglas and State of Nebraska, have invented certain useful Improvements in Starching-Machines; and I do hereby declare that the following is a full, clear, and exact description of the invention, such as will enable others skilled in the art to which it appertains to make and use the same, reference being had to the accompanying drawings, which form a part of this specification.

This invention has relation to a novel and simple starching-machine, the idea being to provide a machine so cheaply constructed that the owners of small laundries will be able to buy the same, the cheapness of construction being one of the essential features.

In the accompanying drawings, Figure 1 shows a central sectional view of the starching trough and holder, while Fig. 2 shows an end view of the holder as employed in my invention.

In fulfilling the aim of my invention I provide a trough 2 of any suitable size and material, though I think the best results are obtained when this trough is made of wood. Secured to the bottom of this trough are a series of ribs 3, extending fully across the bottom of the trough, and over which ribs the holder is made to reciprocate in starching the articles.

In Figs. 1 and 2 I have shown a holder which comprises a rectangular frame having two sides 4 and the end pieces 8 and 9, rounded at their upper edges, so as to provide a handhold, this holder being adapted to be reciprocated within the trough either by hand or by any suitable mechanical means. This holder is bottomless, but near its lower edge each of the side pieces is provided with a groove 5, the end strips 8 and 9 not extending beyond the upper edge of this groove. At one point I provide a stop 20, against which one of a series of slats 7 abuts, these slats forming a removable bottom for my holder. One of the end strips is further provided with an ear 10, movably holding a bar 10ª, the upper end 12 of which is adapted to be held by a ratchet-bar 16, pivoted by means of an ear 15 to the end strip 9, while the lower end 13 of this bar 10ª is provided with the set-screw 14, which bears against the outer slat 7. This arrangement would comprise my invention. Now the articles that are to be starched are clamped between the bottom slats 7, so that they project downward, and after a sufficient quantity of articles have been clamped between these bottom slats the upper end 12 of the locking-bar 10ª is thrown outward to secure and clamp the bottom slats together, the locking-bar being secured by means of the rack 16. The holder is then placed into the trough, which has previously been partly filled with a suitable quantity of starch, when the holder is reciprocated within the trough, so that the articles to be starched are successively carried over the ribs 3.

The device is noticeable because of its extreme simplicity; and,

Having thus described my said invention, what I claim as new, and desire to secure by United States Letters Patent, is—

1. In a starching-machine the combination with a suitable trough, provided upon its bottom with a series of ribs, of a holder, said holder comprising a movable frame having a series of bottom slats within said holder, and a locking bar and rack to secure said bottom slats, all substantially as and for the purpose set forth.

2. In a starching-machine the combination with the trough 2, provided with the ribs 3, of a holder comprising a bottomless frame having a series of removable bottom slats 7 therein, a locking-bar provided with an adjusting-screw 14 and pivotally secured to said holder, and a locking-rack 16 adapted to hold said locking-bar, all substantially as and for the purpose set forth.

In testimony whereof I affix my signature in presence of two witnesses.

HANS JENSEN.

Witnesses:
H. W. PENNOCK,
G. W. SUES.